(12) United States Patent
Manthiram et al.

(10) Patent No.: US 6,361,755 B1
(45) Date of Patent: Mar. 26, 2002

(54) LOW TEMPERATURE SYNTHESIS OF $LI_4MN_5O_{12}$ CATHODES FOR LITHIUM BATTERIES

(75) Inventors: Arumugam Manthiram; Jaekook Kim, both of Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 09/275,504

(22) Filed: Mar. 24, 1999

Related U.S. Application Data (60) Provisional application No. 60/079,217, filed on Mar. 24, 1998.

(51) Int. Cl.[7] .................. C01G 45/12; C01G 49/00; C01G 37/14; H01M 4/32; H01M 4/50
(52) U.S. Cl. .................. 423/599; 423/594; 423/595; 423/596; 429/223; 429/224
(58) Field of Search .................. 423/599, 594, 423/49, 138, 179.5, 595, 596; 429/224, 231.95, 223

(56) References Cited

U.S. PATENT DOCUMENTS

| | | | |
|---|---|---|---|
| 3,850,851 A | * 11/1974 | Koberstein et al. | 252/474 |
| 3,931,391 A | * 1/1976 | Koberstein et al. | 423/404 |
| 4,828,834 A | 5/1989 | Nagaura et al. | |
| 4,980,251 A | 12/1990 | Thackeray et al. | |
| 5,135,732 A | * 8/1992 | Barboux et al. | 423/593 |
| 5,160,712 A | * 11/1992 | Thackeray et al. | 423/138 |
| 5,240,794 A | 8/1993 | Thackeray et al. | |
| 5,419,986 A | 5/1995 | Kainthla et al. | |
| 5,565,688 A | * 10/1996 | Hayashi | 252/182.1 |
| 5,618,640 A | * 4/1997 | Idota et al. | 429/194 |
| 5,680,685 A | 10/1997 | Bischoff | |
| 5,700,442 A | * 12/1997 | Bloch et al. | 423/599 |
| 5,747,193 A | * 5/1998 | Gerand et al. | 429/224 |
| 5,780,181 A | * 7/1998 | Idota et al. | 429/194 |
| 5,792,574 A | * 8/1998 | Mitate et al. | 429/194 |
| 5,807,646 A | * 9/1998 | Iwata et al. | 429/224 |
| 5,817,436 A | * 10/1998 | Nishijima et al. | 429/194 |
| 5,866,279 A | * 2/1999 | Wada et al. | 429/224 |
| 5,869,208 A | * 2/1999 | Miyasaka | 429/224 |
| 5,871,863 A | * 2/1999 | Miyasaka | 429/218 |
| 5,961,950 A | * 10/1999 | Dahn et al. | 423/599 |
| 5,980,786 A | * 11/1999 | Yamashita et al. | 252/518.1 |
| 5,985,488 A | * 11/1999 | Mitate et al. | 429/223 |
| 6,033,798 A | * 3/2000 | Tabuchi et al. | 429/90 |

FOREIGN PATENT DOCUMENTS

JP   003-98262 A   * 4/1991
JP   05-205741 A   * 8/1993

OTHER PUBLICATIONS

U.S. Patent application Ser. No. 09/283,319 (UTXB:660).
Burke and Murphy, "Material characteristics and the performance of electrochemical capacitors for electric/hybrid vehicle applications," *Mat. Res. Soc. Sump. Proc.*, 393:375–395, 1995.
Conway, "Transition from 'supercapacitor' to 'battery' behavior in electrochemical energy storage," *J. Electrochem. Soc.*, 138(6):1539–1548, Jun. 1991.

(List continued on next page.)

*Primary Examiner*—Steven P. Griffin
*Assistant Examiner*—Cam N. Nguyen
(74) *Attorney, Agent, or Firm*—Fulbright & Jaworski L.L.P.

(57) ABSTRACT

A spinel oxide, $Li_4Mn_5O_{12}$, is synthesized by a solution phase oxidation reaction of $Mn^{2+}$ with lithium peroxide in the presence of excess lithium hydroxide, followed by firing at $T \leq 500°$ C. This material may be useful as a cathode for rechargeable lithium batteries. Samples fired at 400° C. and 500° C. show an initial capacity of, respectively, 160 mAh/g and 153 mAh/g, in the voltage range 3.3–2.3 V. These capacities are close to the theoretical value. The sample fired at 500° C. shows excellent cyclability with <2% capacity decline over 40 cycles.

30 Claims, 4 Drawing Sheets

OTHER PUBLICATIONS

Ferg, et al., "Spinel anodes for lithium–ion batteries," *J. Electrochem. Soc.*, 141(11):L147–L150, Nov. 1994.

Gao and Dahn, "Synthesis and characterization of $Li_{1+x+Mn}2_{-x}O_4$ for Li–Ion battery applications," *J. Electrochem. Soc.*, 143(1):100–114, Jan. 1996.

Gao and Dahn, "The high temperature phase diagram of $Li_{1+x}Mn_{2-x}O_4$ and its implications," *J. Electrochem. Soc.*, 143(6):1783–1788, Jun. 1996.

Gummow et al., "Improved capacity retention in rechargeable 4 V lithium/lithium–manganese oxide (spinel) cells," *Solid State Ionics*, 69:59–67, 1994.

Ohzuku et al., "Electrochemistry of manganese dioxide in lithium nonaqueous cell, III. X–ray diffractional study on the reduction of spinel–related manganese dioxide," *J. Electrochem. Soc.*, 137(3):769–775, Mar. 1990.

Takada et al., "Preparation and crystal structure refinement of $Li_4Mn_5O_{12}$ by the Rietveld method," *J. Solid State Chem.*, 115:420–426, 1995.

Tarascon et al., "The spinel phase of $LiMn_2O_4$ as a cathode in secondary lithium cells," *J. Electrochem. Soc.*, 138(10):2859–2864, Oct. 1991.

Thackeray et al., "Lithium insertion into manganese spinels," *Mater. Res. Bull.*, 18:461–472, 1983.

Thackeray et al., "Spinel electrodes from the Li–Mn–O system for rechargeable lithium battery applications," *J. Electrochem. Soc.*, 139(2):363–366, Feb. 1992.

Thackeray et al., "The thermal stability of lithium–manganese–oxide spinel phases," *Mater. Res. Bull.*, 31(2):133–140, 1996.

Thackeray et al., "Thermal stability of $Li_4Mn_5O_{12}$ electrodes for lithium batteries," *J. Solid State Chem.*, 125:274–277, 1996.

Tsang and Manthiram, "A new route for the synthesis of $LiMn_2O_4$ cathode: variation of composition, microstructure, and electrochemical behavior with synthesis temperature," *Solid State Ionics*, 89:305–312, 1996.

Yamada et al., "Synthesis and structural aspects of $LiMn_2O_4\pm\delta$ as a cathode for rechargeable lithium batteries," *J. Electrochem. Soc.*, 142(7):2149–2156, Jul. 1995.

Yamada, "Lattice instability in $Li(Li_xMn_{2-x})O_4$," *J. Solid State Chem.*, 122:160–165, 1996.

Zheng and Jow, "A new charge storage mechanism for electrochemical capacitors," *J. Electrochem. Soc.* 142(1):L6–L8, Jan. 1995.

Zheng et al., "Hydrous ruthenium oxide as an electrode material for electrochemical capacitors," *J. Electrochem. Soc.* 142(8):2699–2703, Aug. 1995.

* cited by examiner

LOW TEMPERATURE SYNTHESIS OF LI$_4$MN$_5$O$_{12}$ CATHODES FOR LITHIUM BATTERIES

This application claims priority to provisional patent application Serial No. 60/079,217 filed Mar. 24, 1998, entitled "Low Temperature Synthesis Of Li$_4$Mn$_5$O$_{12}$ Cathodes For Rechargeable Lithium Batteries," by Arumugam Manthiram and Jaekook Kim. The entire text of the above-referenced disclosure is specifically incorporated by reference herein without disclaimer.

The government owns rights in the present invention pursuant to grant number DMR-9401999 from the National Science Foundation.

BACKGROUND OF THE INVENTION

1. Field of the Invention

The present invention relates generally to lithium batteries. More particularly, it concerns a method of preparing a spinel oxide suitable for use as a cathode in a lithium battery. The spinel oxide, Li$_4$Mn$_5$O$_{12}$, is synthesized via a solution phase oxidation reaction followed by oven firing.

2. Description of Related Art

The high cost and high toxicity of cobalt has created enormous interest in development of less expensive, environmentally benign manganese-based cathodes as an alternative to cobalt-based cathodes for rechargeable lithium batteries. The spinel oxide LiMn$_2$O$_4$ is being intensively pursued in this regard (Thackeray et al., 1983; Ohzuku et al., 1990; Thackeray et al., 1992; Tarascon et al., 1991; Gummow et al., 1994; Ferg et al., 1994; Yamada et al., 1995; Gao and Dahn, 1996a).

LiMn$_2$O$_4$ shows two plateaus in voltage versus capacity plots, one around 4V and the other around 3V. While the 4V region generally shows good cyclability and ample capacity, the 3V region exhibits drastic capacity fading upon cycling due to the macroscopic volume change associated with a cooperative Jahn-Teller distortion. As a result, the capacity in the 3V region (about 150 mAh/g, theoretically) of the stoichiometric LiMn$_2$O$_4$ spinel cannot be practically utilized.

It is known that the cyclability in the 3V region can be improved by increasing the average oxidation state of manganese through a substitution of lithium for manganese in Li$_{1+x}$Mn$_2$O$_4$. Such substitutions may help to suppress Jahn-Teller distortions. For example, in the 3V region, the limiting case of x=0.33, corresponding to composition Li$_4$Mn$_5$O$_{12}$ is known to show better cyclability than the x=0 case corresponding to composition LiMn$_2$O$_4$. Although the increase in the oxidation state of manganese leads to a monotonic decrease in capacity in the 4 V region, it results in a better cyclability in the 3 V region, as cubic symmetry can be preserved to higher degrees of lithium insertion into the manganate lattice sites.

Li$_4$Mn$_5$O$_{12}$ may be unstable to heat treatment and may disproportionate to LiMn$_2$O$_4$ and Li$_2$MnO$_3$ at higher temperatures (Thackeray et al., 1992; Thackeray, Mansuetto, Dees and Vissers, 1996; Gao and Dahn, 1996b). This is significant in that Li$_4$Mn$_5$O$_{12}$ is generally synthesized by firing a mixture of manganese oxides or salts with lithium salts, and the diffusional limitations in such reactions necessitate higher firing temperatures (T>600° C.) in order for the reaction to go to completion.

Also, it is known that the oxidation state of manganese in the raw materials used to prepare spinel oxide materials is an important factor in determining the nature of the reaction product. For example, while raw materials with Mn$^{3+}$ tend to favor the formation of LiMn$_2$O$_4$, those with Mn$^{4+}$ help to stabilize Li$_4$Mn$_5$O$_{12}$.

SUMMARY OF THE INVENTION

The present invention provides low temperature synthesis procedures for the preparation of Li$_4$Mn$_5$O$_{12}$. The solution phase oxidation reaction disclosed herein employs lithium peroxide with lithium hydroxide and manganese acetate to obtain a precursor containing Mn$^{4+}$. This precursor is preferably in the form of a precipitate. Advantageously, the use of a precursor containing Mn$^{4+}$ may favor the formation of Li$_4$Mn$_5$O$_{12}$ at low temperatures. In the method of the present invention, the precursor containing Mn$^{4+}$ may be fired at low to moderate temperatures (up to about 500° C.), causing it to lose water and yield Li$_4$Mn$_5$O$_{12}$. Preferably the precursor is fired at temperatures of about 500° C. or less. Advantageously, the low firing temperatures of the present method may serve to preclude disproportionation of Li$_4$Mn$_5$O$_{12}$ to form LiMn$_2$O$_4$ and Li$_2$MnO$_3$. As used herein, "low temperature" means a temperature of about 500° C. or less. As used herein, a precursor that is "fired" is heated. As used herein, a substance, such as a precursor, having a first temperature may be "heated" or may undergo "heating" by causing the temperature of the substance to rise relative to the first temperature.

Alternatively, hydrogen peroxide can be used instead of lithium peroxide and lithium carbonate can be used instead of lithium hydroxide with modifications in quantity that would be apparent to one of skill in the art. Advantageously, the general procedure described can be used with appropriate modifications, such as the use of manganese acetate with or without other metal acetates, that would be apparent to one of skill in the art to obtain other spinel cathodes such as Li$_2$Mn$_4$O$_{9-\delta}$ ($0 \leq \delta \leq 1$), Li$_{1+x}$Mn$_{2-x}$O$_{4+\delta}$ ($0 \leq x \leq 0.33$ and $0 \leq \delta \leq 0.5$) and Li$_{1+x}$Mn$_{2-x-y}$M$_y$O$_{4+\delta}$ ($0 \leq x \leq 0.33$, $0 \leq y \leq 2.0$, $0 \leq \delta \leq 0.5$ and M=Cr, Fe, Co, Ni or Cu). The general procedure may also be used to produce other transition metal oxide cathodes such as LiCoO$_2$, LiNiO$_2$ and LiNi$_{1-y}$M$_y$O$_2$ (M=Mn, Fe, Co or Cu). In this case, the procedure calls for the use of cobalt acetate or nickel acetate with or without other metal acetates, and a firing temperature of about 300° C. to about 900° C.

Surprisingly, the solution-based, low-temperature method described herein is able to access all Mn$^{4+}$ without oxygen vacancies in Li$_4$Mn$_5$O$_{12}$. Samples synthesized according to the methods disclosed herein at T≤500° C. show excellent capacity retention in the 3V region with a maximum capacity of 160 mAh/g, which is close to the theoretical value.

It is contemplated that the materials prepared via the methods of the present invention may be useful as cathodes for rechargeable lithium batteries. It is further contemplated that the materials prepared via the methods of the present invention may be particularly well-suited for use in lithium polymer batteries. Advantageously, the Li$_4$Mn$_5$O$_{12}$ samples obtained by this low temperature approach exhibit a capacity close to the theoretical value, with excellent cyclability, making them well-suited for use as a cathode in a rechargeable lithium battery. The electrochemical characteristics of the samples also suggest possible use in electrochemical capacitor (supercapacitor) applications.

In a broad aspect, the invention is a process for forming a precipitate including admixing a first aqueous solution and a second aqueous solution with a third aqueous solution to produce the precipitate. As used herein, "admixing" means mixing or blending using any suitable means such as stirring, vibrating, shaking, agitating or the like. The first aqueous solution may include lithium peroxide or hydrogen peroxide. The second aqueous solution may include lithium hydroxide or lithium carbonate. The third aqueous solution may include manganese acetate.

In other aspects, the process may include filtering the precipitate and heating the precipitate to produce a spinel oxide. The spinel oxides disclosed herein are transition metal oxides. The process may also include grinding the spinel oxide to form a cathode. The admixing may include stirring. The precipitate may be heated to about 500° C. or less, and it may be heated at a rate of about 1° C./minute to about 10° C./minute. The precipitate may be heated to from about 300° C. to about 500° C., and it may be heated for about one to about five days. The precipitate may be allowed to dry in air at ambient temperature prior to being heated. The third aqueous solution may include manganese acetate without other metal acetates, and the spinel oxide may include $Li_4Mn_5O_{12}$; $Li_2Mn_4O_{9-\delta}$, where $0 \leq \delta \leq 1$; or $Li_{1+x}Mn_{2-x}O_{4+\delta}$, where $0 \leq x \leq 0.33$ and $0 \leq \delta \leq 0.5$. The third aqueous include manganese acetate with other metal acetates, such as chromium acetate, iron acetate, cobalt acetate, nickel acetate or copper acetate, for example, and the spinel oxide may include $Li_{1+x}Mn_{2-x-y}M_yO_{4+\delta}$, where $0 \leq x \leq 0.33$, $0 \leq y \leq 2.0$, $0 \leq \delta \leq 0.5$ and M selected from the group consisting of Cr, Fe, Co, Ni and Cu. The first aqueous solution may include lithium peroxide, the second aqueous solution may include lithium hydroxide, and the precipitate may include $Li_xMn_{y-\eta}M_\eta O_z \cdot nH_2O$, where $1 \leq x \leq 1.33$, $1.66 \leq y \leq 2.0$, $0 \leq \eta \leq y$, $2.3 \leq z \leq 4.5$ and $0 \leq n \leq 30$.

In another aspect, the invention is a process for forming a precipitate including admixing a first aqueous solution and a second aqueous solution with a third aqueous solution to produce the precipitate. The first aqueous solution may include lithium peroxide or hydrogen peroxide. The second aqueous solution may include lithium hydroxide or lithium carbonate. The third aqueous solution may include cobalt acetate or nickel acetate.

In other aspects, the process may include filtering the precipitate and heating the precipitate to produce a transition metal oxide. The process may also include grinding the transition metal oxide to form a cathode. The precipitate may be heated to from about 300° C. to about 900° C. The precipitate may also be heated to from about 600° C. to about 900° C. The admixing may include stirring. The third aqueous solution may include cobalt acetate without other metal acetates, the transition metal oxide may include $LiCoO_2$, and the precipitate may be heated for about one to about five days. The third aqueous solution may include nickel acetate without other metal acetates, the transition metal oxide may include $LiNiO_2$, and the precipitate may be heated for about one to about five days. The third aqueous solution may include nickel acetate with other metal acetates, such as manganese acetate, iron acetate, cobalt acetate, or copper acetate, for example, the spinel oxide may include $LiNi_{1-y}M_yO_2$, where $0 \leq y \leq 1.0$, and M is selected from the group consisting of Mn, Fe, Co, and Cu, and the precipitate may be heated for about one to about five days.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of illustrative embodiments presented herein.

DETAILED DESCRIPTION OF ILLUSTRATIVE EMBODIMENTS

Disclosed herein is the use of an oxidation reaction in solution employing lithium peroxide to obtain a precursor containing $Mn^{4+}$, which upon firing at moderate temperatures loses water and gives $Li_4Mn_5O_{12}$.

The solution-based, low-temperature method described herein is able to access all $Mn^{4+}$ without oxygen vacancies in $Li_4Mn_5O_{12}$. The samples synthesized at $T \leq 500°$ C. show excellent capacity retention in the 3V region with a maximum capacity of 160 mAh/g, which is close to the theoretical value.

In voltage versus capacity plots, $LiMn_2O_4$ displays a 4 V plateau region corresponding to the extraction of lithium from the 8a tetrahedral lattice sites and a 3 V plateau region corresponding to the insertion of lithium into the 16c octahedral lattice sites. While cubic symmetry is preserved in the 4 V region, a transition to tetragonal symmetry occurs in the 3 V region, due to Jahn-Teller distortion, as the average oxidation state of manganese falls below 3.5+. Furthermore, the $LiMn_2O_4$ spinel exhibits Jahn-Teller distortion at $T \approx 280$ K, as the sample is cooled just below room temperature (Yamada, 1996), which can influence the cyclability of $LiMn_2O_4$ cathodes.

The Jahn-Teller distortion can, however, be suppressed by increasing the average oxidation of manganese through aliovalent cationic substitutions for Mn. For example, substitution of Li for Mn in $Li_{1+x}Mn_{2-x}O_4$ increases the average oxidation state of manganese and suppresses the Jahn-Teller distortion (Thackeray et al., 1992; Gummow et al., 1994; Yamada, 1996). At the limiting case of x=0.33, a manganese oxidation state of 4+ can be achieved, corresponding to a composition of $Li_4Mn_5O_{12}$. Although the increase in the oxidation state of manganese leads to a monotonic decrease in capacity in the 4 V region, it results in a better cyclability in the 3 V region, as the cubic symmetry can be preserved to higher degrees of lithium insertion into the 16c lattice sites. For instance, cubic symmetry may be preserved at least to x=2.5 in $Li_{4+x}Mn_5O_{12}$ (Thackeray et al., 1992). Considering the above, $Li_4Mn_5O_{12}$ has become an attractive cathode for rechargeable 3 V lithium batteries. $Li_4Mn_5O_{12}$ exhibits no capacity in the 4 V region, and a theoretical capacity of 163 mAh/g in the 3 V region.

Unfortunately, $Li_4Mn_5O_{12}$ is unstable to heat treatment and disproportionates to $LiMn_2O_4$ and $Li_2MnO_3$ at higher temperatures (Thackeray et al., 1992; Thackeray, Mansuetto, Dees and Vissers, 1996; Gao and Dahn, 1996b). Although Takada et al. have reported that $Li_4Mn_5O_{12}$ is stable up to about 600° C., Thackeray et al. (1996b) have reported more recently that oxygen begins to be lost above 420° C., and the oxygen is not fully regained upon cooling even when the sample is heated only to 620° C. during thermogravimetric analysis. This is significant in that $Li_4Mn_5O_{12}$ is generally synthesized by firing a mixture of manganese oxides or salts with lithium salts, and the diffusional limitations in such reactions necessitate higher firing temperatures (T>600° C.) in order for the reaction to go to completion. Furthermore, it is difficult to achieve all $Mn^{4+}$ in $Li_4Mn_5O_{12}$ by these procedures, and the samples are oxygen deficient. The maximum oxidation state achieved even after applying a high oxygen pressure of 10 atm is about 3.8+ (Takada et al., 1995). Also, the oxidation state of manganese in the raw materials has been found to be critical. While raw materials with $Mn^{3+}$ tend to favor the formation of $LiMn_2O_4$, those with $Mn^{4+}$ help to stabilize $Li_4Mn_5O_{12}$.

Figure 1:
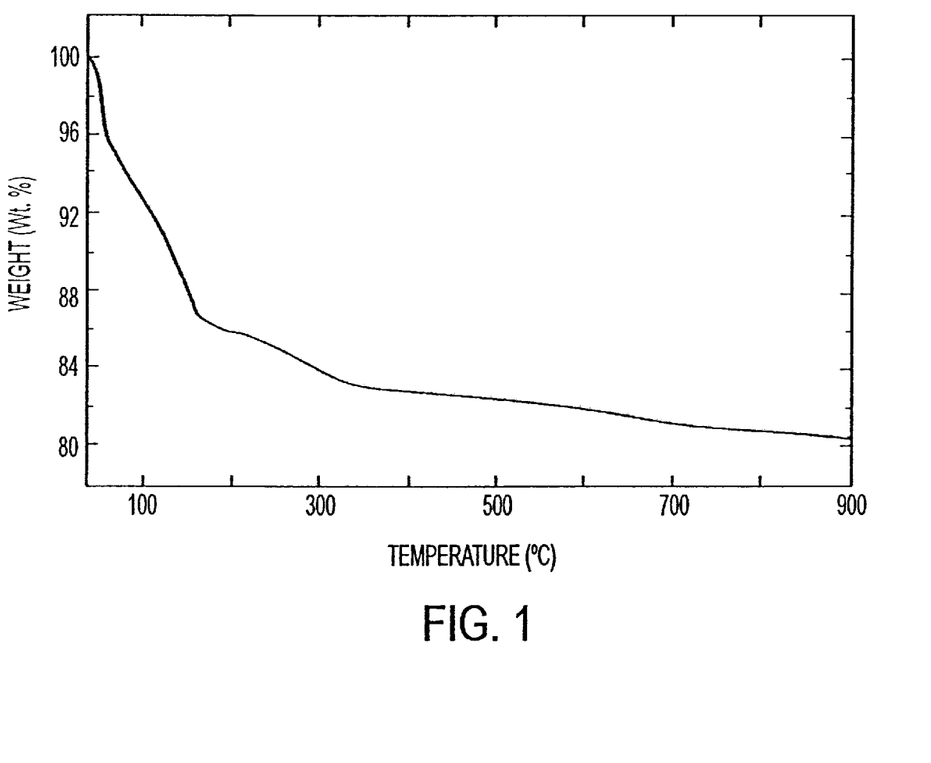
FIG. 1 shows a thermogravimetric analysis plot of an as-prepared sample of $Li_4Mn_5O_{12}$, recorded in a flowing mixture of 70% nitrogen and 30% oxygen with a heating rate of 5° C./min.
Figure 2:
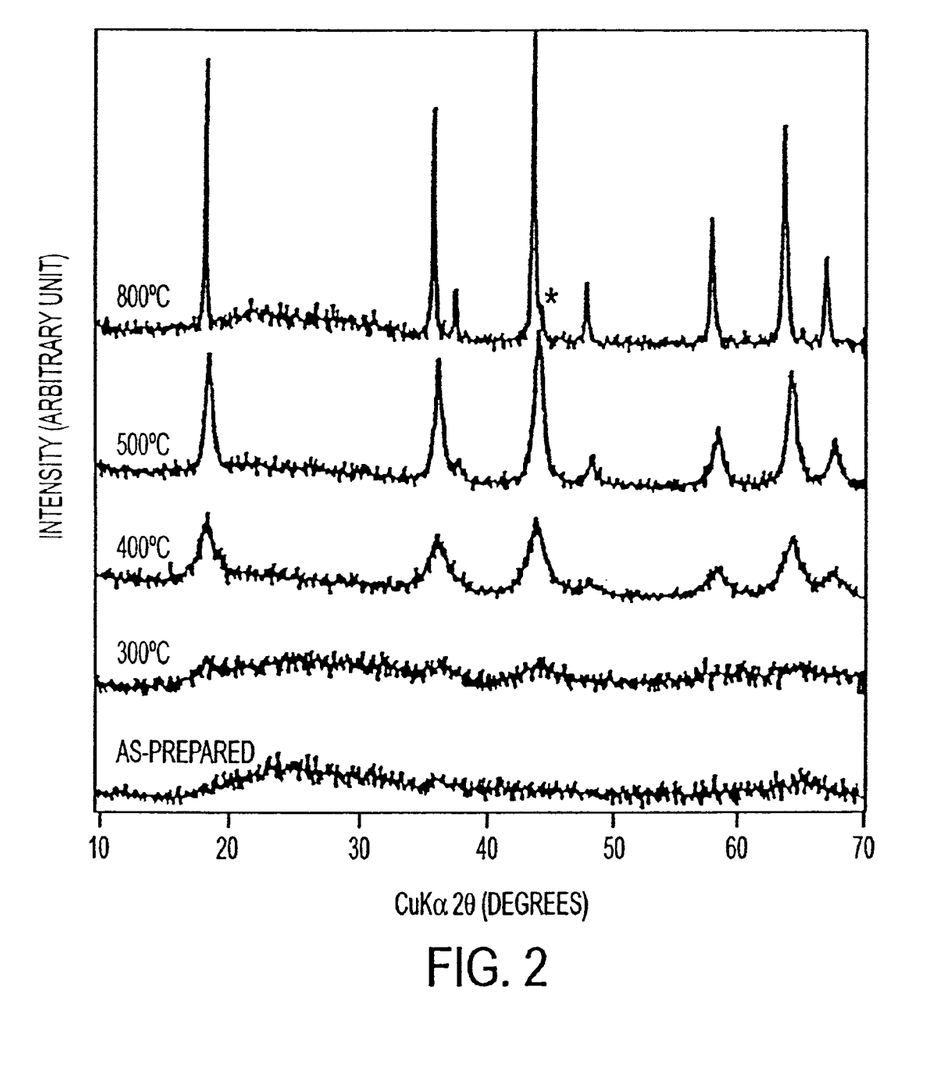
FIG. 2 shows x-ray diffraction patterns for $Li_4Mn_5O_{12}$ at various firing temperatures, as well as unfired.
Figure 3:
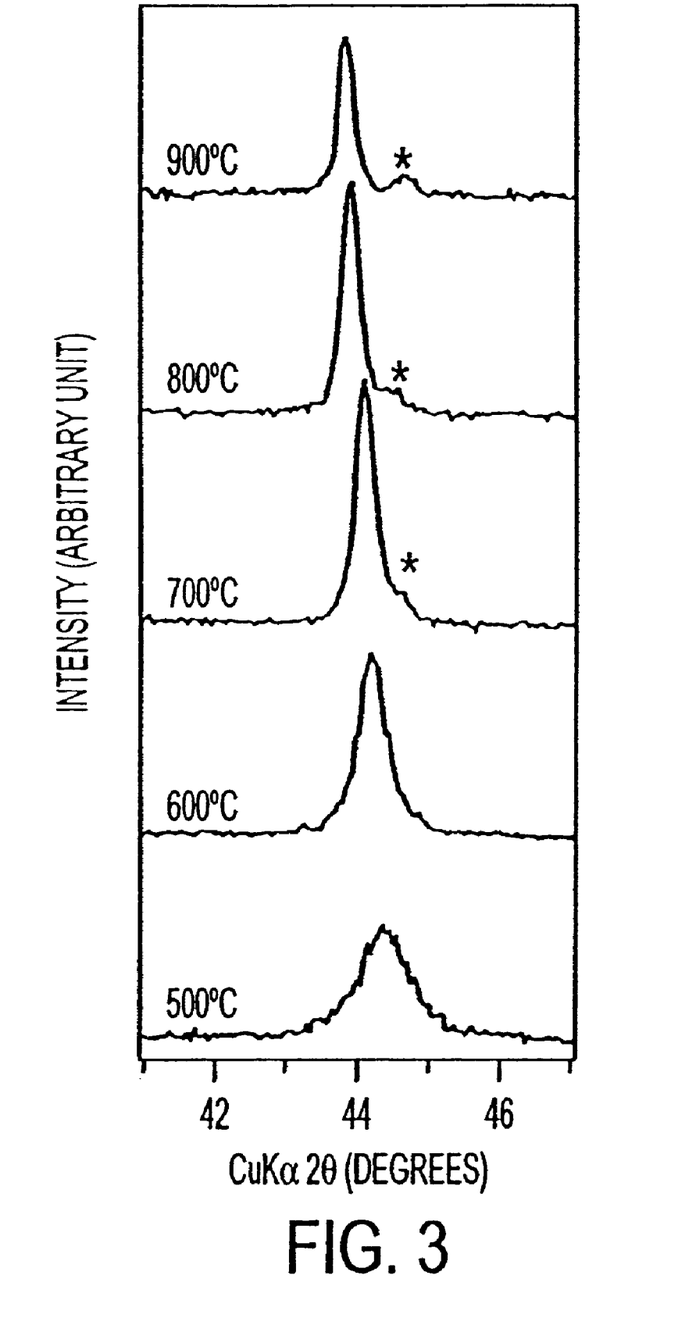
FIG. 3 shows x-ray diffraction patterns for $Li_4Mn_5O_{12}$ over a small two-theta range, illustrating the movement of diffraction peaks to lower angle with increasing firing temperature.

A thermogravimetric analysis plot of the as-prepared sample is shown in FIG. 1. A loss of about 17 wt % occurring below 400° C. corresponds to both absorbed and lattice water. The x-ray powder diffraction patterns of the as-prepared sample and following heating at various temperatures are shown in FIG. 2. The as-prepared sample does not show any discernible reflections. On the other hand, the sample fired at 300° C. begins to develop broad reflections corresponding to the spinel structure and these reflections become well defined as the firing temperature increases to 400° C. The x-ray powder diffraction patterns shown in FIG. 3 for a smaller two-theta range reveal that the reflections move progressively to lower angles as firing temperature increases above 500° C. In addition, a small reflection corresponding to $Li_2MnO_3$ appears for firing temperatures $T \geq 700°$ C. These results suggest that $Li_4Mn_5O_{12}$ begins to disproportionate at T>500° C., at least according to the x-ray data, to give $Li_{1+x}Mn_{2-x}O_4$ (x<0.33) and $Li_2MnO_3$.

Atomic absorption spectroscopy data of the samples fired at 400° C. and 500° C. reveal a lithium content of x=3.98 in $Li_xMn_5O_{12}$. Oxidation state analysis reveals a manganese oxidation state of 3.98 and 3.97+, respectively, in the 400° C. and 500° C. samples. The 400° C. and 500° C. samples have lattice parameters of, respectively, 8.121(46) Å and 8.131(23) Å, which are slightly smaller than the literature value of 8.137 Å(Thackeray et al., 1992). Although the standard deviations are larger due to the broad diffraction peaks, the smaller lattice parameter is consistent with the higher oxidation state of manganese achieved in the samples. The chemical analysis and lattice parameter values clearly indicate that the solution-based low temperature approach can access all $Mn^{4+}$ in $Li_4Mn_5O_{12}$ without oxygen vacancies.

Figure 4:
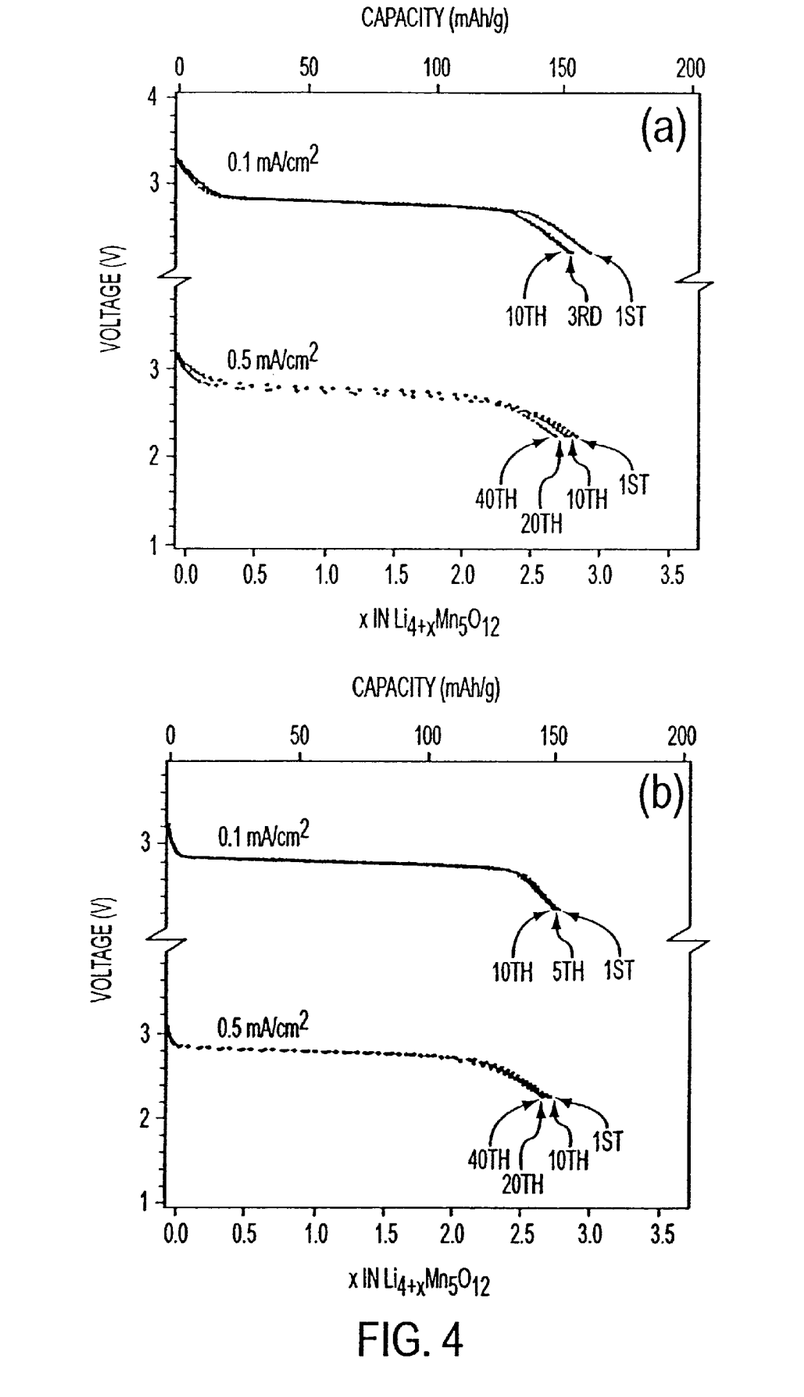
FIG. 4 shows discharge curves for $Li_4Mn_5O_{12}$ recorded at current densities of 0.1 and 0.5 $mA/cm^2$: (a) after firing at 400° C., and (b) after firing at 500° C.

The discharge curves of the samples fired at 400° C. and 500° C. are given in FIG. 4 for two current densities. The sample fired at 400° C. exhibits an initial capacity of 160 mAh/g in the range 3.3–2.3 V, which is close to the theoretical capacity of 163 mAh/g. The sample fired at 500° C. shows a slightly lower initial capacity of 153 mAh/g. However, the 500° C. sample exhibits better cyclability than the 400° C. The inventors believe that a better crystallinity of the 500° C. sample (see FIG. 2) leads to a better cyclability. The observed capacity and cyclability are superior to that found with samples prepared by conventional ceramic procedures (Thackeray et al., 1992; Gummow et al., 1994).

Electrodes, including positive electrodes (cathodes), for use in energy storage and conversion devices, including batteries and supercapacitors, may be fabricated by admixing a first aqueous solution including lithium peroxide or hydrogen peroxide and a second aqueous solution including lithium hydroxide or lithium carbonate with a third aqueous solution including manganese acetate, cobalt acetate or nickel acetate to form a precursor of a transition metal oxide. The precursor may then be heated to form a transition metal oxide. In one embodiment, the disclosed transition metal oxide compositions may be further processed by, for example, grinding to form an electrode. As used herein, "grinding" refers to mixing, crushing, pulverizing, pressing together, polishing, reducing to powder or small fragments, milling, ball milling, or any other suitable process to wear down a material. A conducting material may be mixed with the transition metal oxide in the process of forming an electrode. The conducting material may be an electrically conductive material such as carbon, which may be in the form graphite or acetylene black, but it will be understood with benefit of this disclosure that the conducting material may alternatively be any other suitable material or mixtures of suitable materials known in the art.

In one embodiment, a transition metal oxide may be prepared in accordance with the present disclosure. In one embodiment, the transition metal oxide may be mixed in a mortar and pestle or ball milled, as known in the art, with between about 5 weight percent and about 40 weight percent carbon, typically about 25 weight percent fine carbon. Mixing may be performed for various intervals of time. In one embodiment, the interval may be about 15 minutes. It will be understood that mixing times may be varied as desired to suit particular mixing processes and product specifications. A transition metal oxide prepared in accordance with the present disclosure may also be mixed with a binding material including, but not limited to, polytetrafluoroethylene (PTFE). In one embodiment, between about 1 and about 20 weight percent PTFE, and typically about 5 weight percent PTFE may be used as a binding material and may be mixed with a synthesized transition metal oxide in a mortar and pestle or ball milled. It is contemplated that other binding materials known in the art may be substituted for PTFE.

With the benefit of this disclosure, the mixed, crushed, and/or ground materials may be fabricated into one or more electrodes for energy conversion and storage according to procedures known in this regard to those skilled in the art. An example of forming a battery electrode and battery is described in U.S. Pat. No. 5,419,986 which is incorporated herein by reference in its entirety. An example of forming a capacitor is described in U.S. Pat. No. 5,680,685 which is incorporated herein by reference in its entirety. Information relating to supercapacitors may be found in Conway (1991), Zheng and Jow (1995), Zheng, Cygan, and Jow (1995), and Burke and Murphy (1995), which are all incorporated herein by reference in their entirety.

Electrodes may be formed in a variety of shapes, sizes, and/or configurations as is known in the art. In one embodiment, electrodes may be formed by rolling a mixture of synthesized transition metal oxide, conducting material, and binding material into one or more thin sheets which may be cut to form, for example, circular electrodes having an area of about 2 $cm^2$ with a thickness of about 0.2 mm and a mass of about 0.06 g. Electrochemical performance of such electrodes may be evaluated according to procedures known in the art. In one embodiment, electrochemical performance of such electrodes may be evaluated with coin-type cells using metallic Li anode and $LiClO_4$ in propylene carbonate/1,2-dimethoxyethane as electrolyte.

The following examples are illustrative and should not be construed as limiting the scope of the invention or claims thereof.

EXAMPLE 1

Aqueous solutions of 160 mL of 0.25 M lithium hydroxide and 80 mL of 0.25M lithium peroxide solutions were mixed together. This mixture was then added immediately to 20 mL of 0.25 M manganese acetate solution kept under constant stirring via magnetic stirrer. The oxidation of $Mn^{2+}$ by lithium peroxide in the presence of excess lithium hydroxide led to the formation of a precipitate, $Li_xMn_yO_z \cdot nH_2O$. The precipitate was filtered and allowed to dry in air at ambient temperature.

EXAMPLE 2

The solid from Example 1 was subjected to heat treatment in air at various temperatures, ranging from 300° C. to 1000° C., for 3 days. A heating rate of 5° C./min and a cooling rate of 2° C./min were used for the heat treatment procedure.

Heat treated samples were characterized by x-ray powder diffraction. Lattice parameters were calculated using a least square program and NaCl as an internal standard.

The lithium and manganese contents were determined by atomic absorption spectroscopy. The oxidation state of manganese was determined by dissolving the solid in a known excess of vanadyl sulfate in 2 N $H_2SO_4$, and titrating the unreacted vanadyl sulfate with standardized permanganate, as reported elsewhere (see Tsang and Manthiram, 1996).

Circular electrodes of about 2 $cm^2$ area were made by mixing the oxide with about 25 weight percent fine carbon and about 5 weight percent polytetrafluoroethylene. Electrode performance was studied with coin-type cells using metallic Li anodes and an electrolyte of $LiClO_4$ in propylene carbonate/1,2-dimethoxyethane.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

For example, precursors that may be formed in accordance with the present disclosure may be heated at a heating rate of from about 1° C./min to about 0° C./min in producing transition metal oxides. Furthermore, precursors that may be formed in accordance with the present disclosure may be heated for about one (1) days to about five (5) days in producing transition metal oxides.

REFERENCES

The following references, to the extent that they provide exemplary procedural or other details supplementary to those set forth herein, are specifically incorporated herein by reference.

Burke and Murphy, Mat. Res. Soc. Sump. Proc. 339, 375, 1995.
Conway, J. Electrochem. Soc. 138, 1539, 1991.
Ferg, Gummow, De Kock, Thackeray, J. Electrochem. Soc., 141:L147, 1994.
Gao and Dahn, J. Electrochem. Soc., 143:100, 1996a.
Gao and Dahn, J. Electrochem. Soc., 143:1783, 1996b.
Gummow, De Kock, Thackeray, Solid State Ionics, 69:59, 1994.
Ohzuku, Kitagawa, Hirai, J. Electrochem. Soc., 137:769, 1990.
Takada, Hayakawa, Akiba, J. Solid State Chem., 115:420, 1995.
Tarascon, Wang, Shokoohi, McKinnon, Colson, J. Electrocheni. Soc., 138:2859, 1991.
Thackeray, David, Bruce, Goodenough, Mater. Res. Bull., 18:461, 1983.
Thackeray, De Kock, Rossouw, Liles, Hoge, Bittihn J. Electrochem. Soc., 139:363, 1992.
Thackeray, Mansuetto, Dees, Vissers, Mater. Res. Bull., 31:133, 1996.
Thackeray, Mansuetto, Johnson, J. Solid State Chem., 125:274, 1996.
Tsang and Manthiram, Solid State Ionics, 89:305, 1996.
Yamada, Miura, Hinokuma, Tanaka, J. Electrochem. Soc., 142:2149, 1995.
Yamada, J. Solid State Chem., 122:160, 1996.
Zheng and Jow, J. Electrochem. Soc. 142, L6, 1995.
Zheng, Cygan, and Jow, J. Electrochem. Soc. 142, 2699, 1995.

What is claimed is:

1. A process for forming a precipitate, comprising:
   admixing a first aqueous solution and a second aqueous solution with a third aqueous solution to form the precipitate;
   wherein the first aqueous solution comprises lithium peroxide or hydrogen peroxide;
   wherein the second aqueous solution comprises lithium hydroxide or lithium carbonate; and
   wherein the third aqueous solution comprises manganese acetate.

2. The process of claim 1, further comprising:
   filtering the precipitate; and
   heating the precipitate to produce a spinel oxide.

3. The process of claim 2, wherein the precipitate is heated to about 500° C. or less.

4. The process of claim 3, wherein the precipitate is heated at a rate of about 1° C./minute to about 10° C./minute.

5. The process of claim 3, wherein the spine oxide comprises $Li_{1+x}Mn_{2-x-y}M_yO_{4+\delta}$, where $0 \leq x \leq 0.33$, $0 \leq y \leq 2.0$, $0 \leq \delta \leq 0.5$ and M is selected from the group consisting of Cr, Fe, Co, Ni and Cu.

6. The process of claim 3, wherein the first aqueous solution comprises lithium peroxide and the second solution comprises lithium hydroxide.

7. The process of claim 3, wherein the precipitate is allowed to dry in air at ambient temperature prior to the heating step.

8. The process of claim 3, further comprising grinding the spinel oxide to form a cathode.

9. The process of claim 2, wherein the precipitate is heated to from about 300° C. to about 500° C.

10. The process of claim 4, wherein the precipitate is heated for about one to about five days.

11. The process of claim 9, wherein the third aqueous solution comprises manganese acetate without other metal acetates.

12. The process of claim 11, wherein the spinel oxide comprises $Li_4Mn_5O_{12}$.

13. The process of claim 11, wherein the spinel oxide comprises $Li_2Mn_4O_{9-\delta}$ where $0 \leq \delta \leq 1$.

14. The process of claim 11, wherein the spinel oxide comprises $Li_{1+x}Mn_{2-x}O_{4+\delta}$, where $0 \leq x \leq 0.33$ and $0 \leq \delta \leq 0.5$.

15. The process of claim 1, wherein the admixing comprises stirring.

16. A process for forming a precipitate, comprising:

admixing a first aqueous solution and a second aqueous solution with a third aqueous solution to form the precipitate;

wherein the first aqueous solution comprises lithium peroxide or hydrogen peroxide;

wherein the second aqueous solution comprises lithium hydroxide or lithium carbonate; and wherein the third aqueous solution comprises cobalt acetate or nickel acetate.

17. The process of claim 16, further comprising:

filtering the precipitate; and heating the precipitate to produce a transition metal oxide.

18. The process of claim 17, wherein the precipitate is heated to from about 300° C. to about 900° C.

19. The process of claim 18, wherein the third aqueous solution comprises cobalt acetate without other metal acetates.

20. The process of claim 19, wherein the transition metal oxide comprises $LiCoO_2$.

21. The process of claim 20, wherein the precipitate is heated for about one to about five days.

22. The process of claim 18, wherein the third aqueous solution comprises nickel acetate without other metal acetates.

23. The process of claim 22, wherein the transition metal oxide comprises $LiNiO_2$.

24. The process of claim 23, wherein the precipitate is heated for about one to about five days.

25. The process of claim 18, wherein the transition metal oxide comprises $LiNi_{1-y}M_yO_2$, where $0 \leq y \leq 1$ and M is selected from the group consisting of Mn, Fe, Co and Cu.

26. The process of claim 25, wherein the precipitate is heated for about one to about five days.

27. The process of claim 18, further comprising grinding the transition metal oxide to form a cathode.

28. The process of claim 17, wherein the precipitate is heated to from about 600° C. to about 900° C.

29. The process of claim 17, further comprising grinding the transition metal oxide to form a cathode.

30. The process of claim 16, wherein the admixing comprises stirring.

* * * * *

UNITED STATES PATENT AND TRADEMARK OFFICE
CERTIFICATE OF CORRECTION

PATENT NO. : 6,361,755 B1
DATED : April 26, 2002
INVENTOR(S) : Manthiram et al.

It is certified that error appears in the above-identified patent and that said Letters Patent is hereby corrected as shown below:

Title page,
Item [57], ABSTRACT,
Line 4, please delete "T $\leqq 500°$ C." and insert -- T$\leq$500°C -- therefor.
Line 5, please delete "400° C." and insert -- 400°C -- therefor.
Line 6, please delete "500° C." and insert -- 500°C -- therefor.
Line 9, please delete "500° C." and insert -- 500°C -- therefor.

Column 8,
Line 36, please delete "500° C." and insert -- 500°C -- therefor.
Line 38, please delete "1° C./minute" and insert -- 1°C/minute -- therefor.
Lines 38-39, please delete "10° C./minute" and insert -- 10°C/minute -- therefor.
Lines 41-42, please delete "$0 \leqq x \leqq 0.33, 0 \leqq y \leqq 2.0, 0 \leqq \delta \leqq 0.5$" and insert
-- $0 \leq x \leq 0.33, 0 \leq y \leq 2.0, 0 \leq \delta \leq 0.5$ -- therefor.
Line 53, please delete "300° C. to about 500° C." and insert -- 300°C to about 500°C -- therefor.
Line 54, please delete "claim 4" and insert -- claim 9 -- therefor.
Line 62, please delete "$0 \leqq \delta \leqq 1$" and insert -- $0 \leq \delta \leq 1$ -- therefor.
Lines 64-65, please delete "$0 \leqq x \leqq 0.33, 0 \leqq \delta \leqq 0.5$" and insert -- $0 \leq x \leq 0.33, 0 \leq \delta \leq 0.5$ -- therefor.

Column 9,
Line 16, please delete "300° C. to about 900° C." and insert -- 300°C to about 900°C -- therefor.

UNITED STATES PATENT AND TRADEMARK OFFICE
CERTIFICATE OF CORRECTION

PATENT NO. : 6,361,755 B1
DATED : April 26, 2002
INVENTOR(S) : Manthiram et al.

It is certified that error appears in the above-identified patent and that said Letters Patent is hereby corrected as shown below:

Column 10,
Line 10, please delete "$0 \leqq y \leqq 1$" and insert -- $0 \leq y \leq 1$ -- therefor.
Line 17, please delete "600º C. to about 900º C." and insert -- 600ºC to about 900ºC -- therefor.

Signed and Sealed this

Eighth Day of October, 2002

Attest:

JAMES E. ROGAN
Attesting Officer    Director of the United States Patent and Trademark Office